United States Patent
Yang et al.

(10) Patent No.: US 8,518,229 B2
(45) Date of Patent: Aug. 27, 2013

(54) INTEGRATED ELECTRODE-CURRENT COLLECTOR SHEET FOR CAPACITIVE DEIONIZATION, CAPACITIVE DEIONIZATION DEVICE AND ELECTRIC DOUBLE LAYER CAPACITOR HAVING THE SAME

(75) Inventors: Ho-jung Yang, Suwon-si (KR);
Hyo-rang Kang, Anyang-si (KR);
Tae-won Song, Yongin-si (KR);
Chang-hyun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 664 days.

(21) Appl. No.: 12/533,777

(22) Filed: Jul. 31, 2009

(65) Prior Publication Data

US 2010/0170784 A1   Jul. 8, 2010

(30) Foreign Application Priority Data

Jan. 6, 2009 (KR) ........................ 10-2009-0000825

(51) Int. Cl.
*C02F 1/469* (2006.01)
*H01M 4/64* (2006.01)

(52) U.S. Cl.
USPC ........... 204/665; 429/517; 429/521; 429/522; 205/742; 204/279

(58) Field of Classification Search
USPC ................ 204/280, 284, 290.01; 429/209, 429/211, 218.1, 231.8, 220, 226, 233; 361/502, 361/503
See application file for complete search history.

(56) References Cited

U.S. PATENT DOCUMENTS

| | | | |
|---|---|---|---|
| 5,196,115 A | 3/1993 | Andelman | |
| 5,296,261 A | 3/1994 | Bouet et al. | |
| 5,425,858 A | 6/1995 | Farmer | |
| 6,406,817 B2 * | 6/2002 | Wariishi et al. | 429/314 |
| 6,781,817 B2 * | 8/2004 | Andelman | 361/503 |
| 7,090,946 B2 * | 8/2006 | Mitchell et al. | 429/231.8 |
| 7,835,137 B2 * | 11/2010 | Kang et al. | 361/502 |
| 8,021,788 B2 * | 9/2011 | Kim et al. | 429/248 |
| 8,119,289 B2 * | 2/2012 | Fukumine et al. | 429/232 |
| 8,202,642 B2 * | 6/2012 | Sumihara et al. | 429/122 |
| 2004/0130851 A1 * | 7/2004 | Faris | 361/503 |
| 2006/0235144 A1 | 10/2006 | Hwang et al. | |
| 2006/0251956 A1 | 11/2006 | Kim et al. | |

(Continued)

FOREIGN PATENT DOCUMENTS

| | | |
|---|---|---|
| JP | 2003323898 A | 11/2003 |
| JP | 2004-251445 | 9/2004 |

(Continued)

OTHER PUBLICATIONS

Final Office Action dated Dec. 13, 2011 from U.S. Appl. No. 12/141,535, filed Jun. 18, 2008, 9 pages.

(Continued)

*Primary Examiner* — Keith Hendricks
*Assistant Examiner* — Salil Jain
(74) *Attorney, Agent, or Firm* — Cantor Colburn LLP (57) ABSTRACT

An integrated electrode-current collector sheet includes a current collector including uneven portions disposed on at least one side of the current collector; and an active material layer disposed on the current collector, the active material layer at least partially covering the uneven portions. In addition, disclosed are a capacitive deionization device and an electric double layer capacitor including the integrated electrode-current collector sheet.

11 Claims, 3 Drawing Sheets

(56) References Cited

U.S. PATENT DOCUMENTS

| | | | |
|---|---|---|---|
| 2007/0178373 A1* | 8/2007 | Hwang et al. | 429/122 |
| 2008/0213671 A1* | 9/2008 | Kogetsu et al. | 429/246 |
| 2009/0020430 A1* | 1/2009 | Yang et al. | 204/660 |

FOREIGN PATENT DOCUMENTS

| | | | |
|---|---|---|---|
| KR | 1019990043892 B1 | 6/1999 |
| KR | 1020010042427 A | 5/2001 |
| KR | 1020020030030 A | 4/2002 |
| KR | 1020030093252 A | 12/2003 |
| KR | 1020040038047 A | 5/2004 |
| KR | 1020040054352 A | 6/2004 |
| KR | 1020040078284 A | 9/2004 |
| KR | 1020050084613 A | 8/2005 |
| KR | 1020060024436 A | 3/2006 |
| KR | 1020060105034 A | 10/2006 |
| KR | 1020070071703 A | 7/2007 |

OTHER PUBLICATIONS

Non-Final Office Action dated Aug. 31, 2011 from U.S. Appl. No. 12/141,535, filed Jun. 18, 2008, 12 pages.

* cited by examiner

INTEGRATED ELECTRODE-CURRENT COLLECTOR SHEET FOR CAPACITIVE DEIONIZATION, CAPACITIVE DEIONIZATION DEVICE AND ELECTRIC DOUBLE LAYER CAPACITOR HAVING THE SAME

CROSS-REFERENCE TO RELATED APPLICATIONS

This application claims priority to Korean Patent Application No. 10-2009-0000825, filed on Jan. 6, 2009, and all the benefits accruing therefrom under 35 U.S.C. §119, the contents of which in its entirety are herein incorporated by reference.

BACKGROUND

1. Field

One or more embodiments relate to an electrode-current collector sheet for capacitive deionization, a capacitive deionization device and an electric double layer capacitor having the same.

2. Description of the Related Art

Capacitive deionization ("CDI") is a technique for removing an ionic material from a medium by absorbing the ionic material into a surface of a carbon electrode having nano-sized pores by applying a first voltage to the carbon electrode. To regenerate the carbon electrode, a second voltage opposite in polarity to the first voltage is applied to the carbon electrode so as to remove the absorbed ionic material, and the ionic material is discharged with water. CDI may operate without chemicals to regenerate the carbon electrode, and may operate without an ion exchange resin, a filter or a membrane. Also, CDI may improve capacitance of the medium without discharging hardness components, such as $Ca^{2+}$ or $Mg^{2+}$, or harmful ions, such as $Cl^-$.

In CDI, when a direct current ("DC") voltage having a low potential difference versus the medium is applied to a carbon electrode while a medium, i.e., an electrolyte containing dissolved ions, flows through a flow path and contacts the carbon electrode, anions are absorbed and concentrated at an anode and cations are absorbed and concentrated at a cathode. Accordingly, when application of the DC voltage is stopped, the concentrated anions and cations are desorbed from the anode and cathode, each of which may be a carbon electrode.

The carbon electrode desirably has a low electrical resistance and a large specific surface area, and thus the carbon electrode is manufactured by binding an activated carbon with polytetrafluoroethlyene ("PTFE"), or the carbon electrode is manufactured by carbonizing a resorcinol formaldehyde resin and then performing a complicated drying process, thereby obtaining a carbon electrode having a plate-like shape.

Electrode sheets, which are formed in a sheet shape by binding an activated carbon with PTFE, are used in commercially available CDI electrodes. Cells for CDI devices are manufactured by pressing together the electrode sheets and the current collectors, which can be a graphite foil. Graphite foils have corrosion stability in charge/discharge regions of CDI devices, unlike metal current collectors. However, in cells manufactured as above, since an electrode sheet and a current collector are separately formed, a contact area between the electrode sheet and the current collector decreases, thereby increasing an electric resistance. Also, it is desirable to reduce pressure loss in CDI. It is therefore desirable to have an electrode-current collector sheet that provides reduced electrical resistance between an electrode sheet and a current collector. It is also desirable to have a cell for CDI having reduced pressure loss in an electrolyte flow path.

SUMMARY

One or more embodiments include an integrated electrode-current collector sheet for capacitive deionization. Uneven portions are disposed on a surface between a current collector and an electrode.

One or more embodiments include a capacitive deionization device including the integrated electrode-current collector sheet.

One or more embodiments include an electric double layer capacitor including the integrated electrode-current collector sheet.

Additional aspects, features and advantages will be set forth in the description which follows.

To achieve the above and/or other aspects, features or advantages, an embodiment includes an integrated electrode-current collector sheet including a current collector including uneven portions disposed on at least one side of the current collector; and an active material layer disposed on the current collector, the active material layer at least partially covering the uneven portions.

An average interval between protrusions of the uneven portions may be in the range of about 300 micrometers ("μm") to about 2 millimeters ("mm").

The uneven portions may be disposed in a stripe shape or as a matrix.

The current collector may include a graphite foil, at least one metal selected from the group consisting of Cu, Al, Ni, Fe, Co and Ti, a mixture thereof or alloy including at least one of the foregoing.

The active material layer may include an active material and a binder. The active material may include a material selected from the group consisting of an activated carbon, a carbon nanotube, a mesoporous carbon, an activated carbon fiber, a graphite oxide, a metal oxide and a combination including at least one of the foregoing. The binder may include a polyurethane, wherein the polyurethane is water-dispersible, and wherein the polyurethane is prepared from poly(tetramethylene ether) glycol or polypropylene glycol, and isophorone diisocyanate or hydrogenated 4,4-diphenyl methane diisocyanate. The amount of the binder may be in the range of about 3 to about 20 parts by weight based on 100 parts by weight of the active material.

To achieve the above and/or other aspects, features or advantages, one or more embodiments includes a capacitive deionization device including an integrated electrode-current collector sheet, the integrated electrode current collector sheet including: a current collector including uneven portions disposed on at least one side of the current collector; and an active material layer disposed on the current collector, the active material layer at least partially covering the uneven portions.

In an embodiment, the integrated electrode-current collector sheet is an integrated electrode-current collector sheet for an electric double layer capacitor.

To achieve the above and/or other aspects, features or advantages, an embodiment includes an electric double layer capacitor including an the integrated electrode-current collector sheet, the integrated electrode current collector sheet including a current collector including uneven portions disposed on at least one side of the current collector; and an active material layer disposed on the current collector, the active material layer at least partially covering the uneven portions.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings.

Aspects, advantages and features of exemplary embodiments of the invention and methods of accomplishing the same may be understood more readily by reference to the following detailed description of embodiments and the accompanying drawings. The exemplary embodiments of the invention may, however, may be embodied in many different forms, and should not be construed as being limited to the embodiments set forth herein. Rather, these embodiments are provided so that this disclosure will be thorough and complete and will fully convey the concept of the invention to those skilled in the art, and the exemplary embodiments of the invention will only be defined by the appended claims. Like reference numerals refer to like elements throughout the specification.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, the term "and/or" includes any and all combinations of one or more of the associated listed items.

It will be understood that, although the terms first, second, third, etc., can be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the exemplary embodiments of the invention.

Spatially relative terms, such as "below," "lower," "upper" and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device can be otherwise oriented (rotated 90 degrees or at other orientations) and the spatially relative descriptors used herein interpreted accordingly.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Also, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Figure 1:
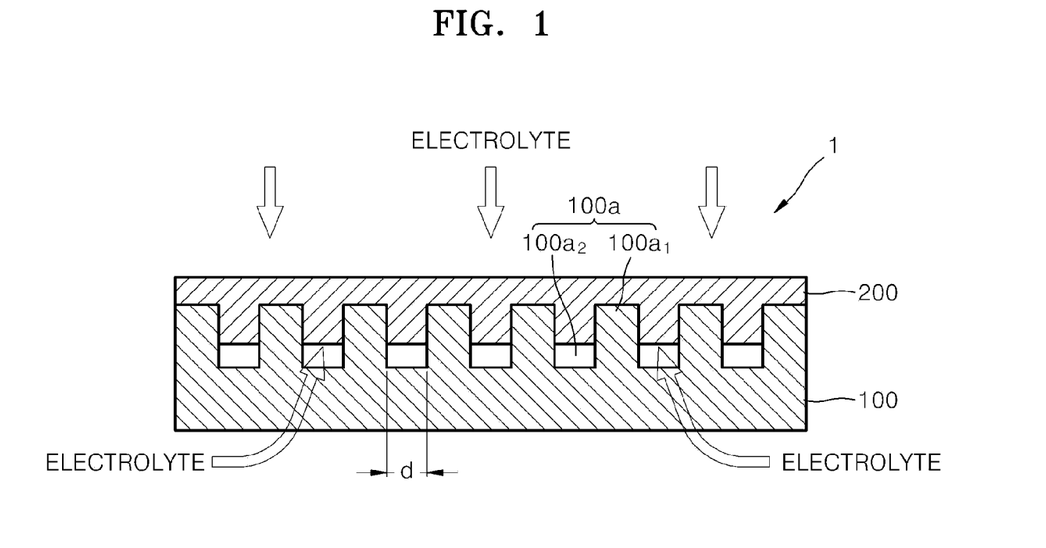
FIG. 1 is a cross-section view of an exemplary embodiment of an integrated electrode-current collector sheet.

FIG. 1 is a cross-section view of an exemplary embodiment of an integrated electrode-current collector sheet 1.

Referring to FIG. 1, the electrode-current collector sheet 1 includes a current collector 100 and an electrode 200.

Figure 2:
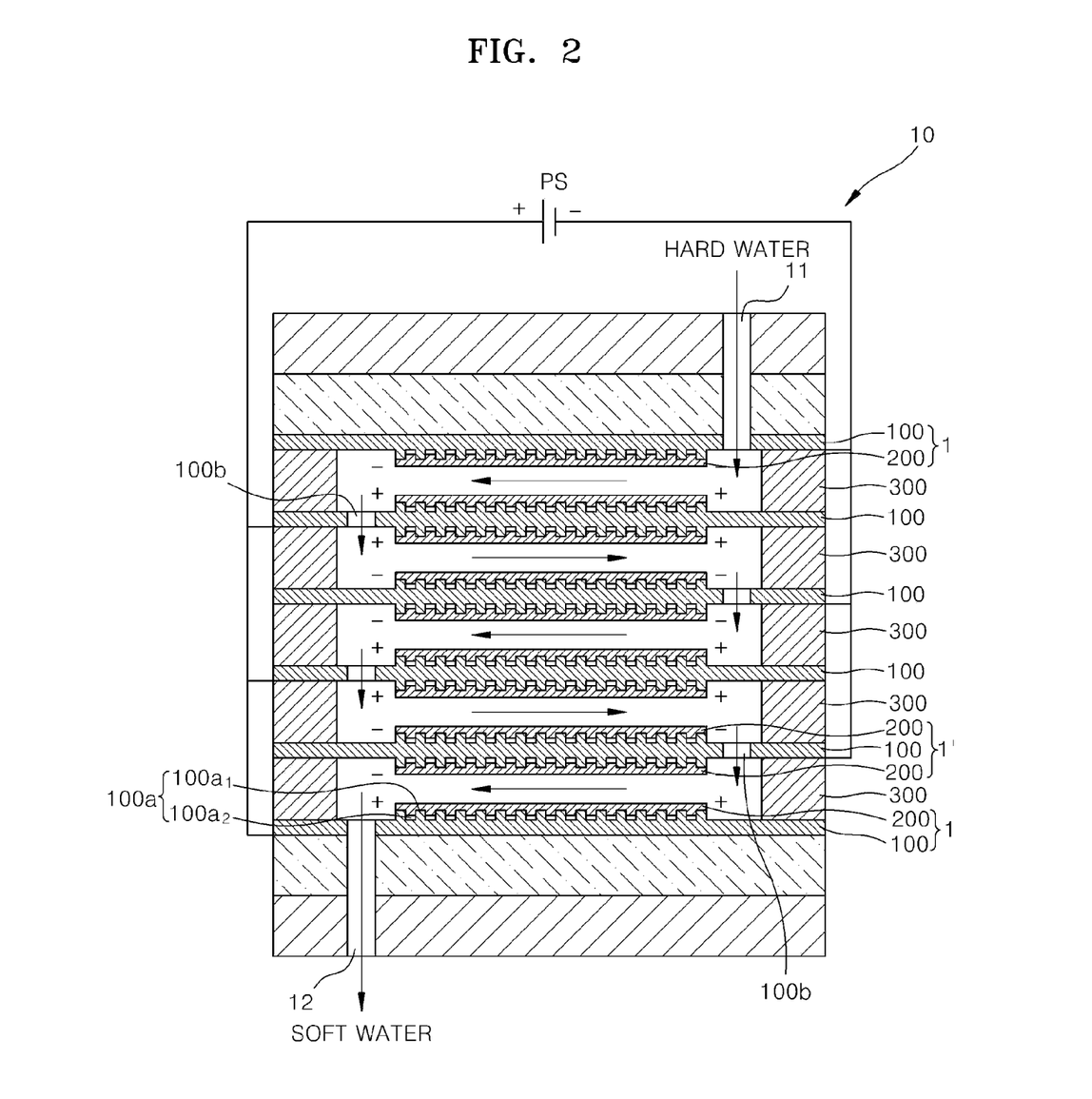
FIG. 2 is a cross-section view schematically illustrating an exemplary embodiment of a capacitive deionization device including a plurality of the integrated electrode-current collector sheets of FIG. 1, having uneven portions disposed on one side, and a plurality of double-sided electrode-current collector sheets, having uneven portions disposed on opposing sides.
Figure 3:
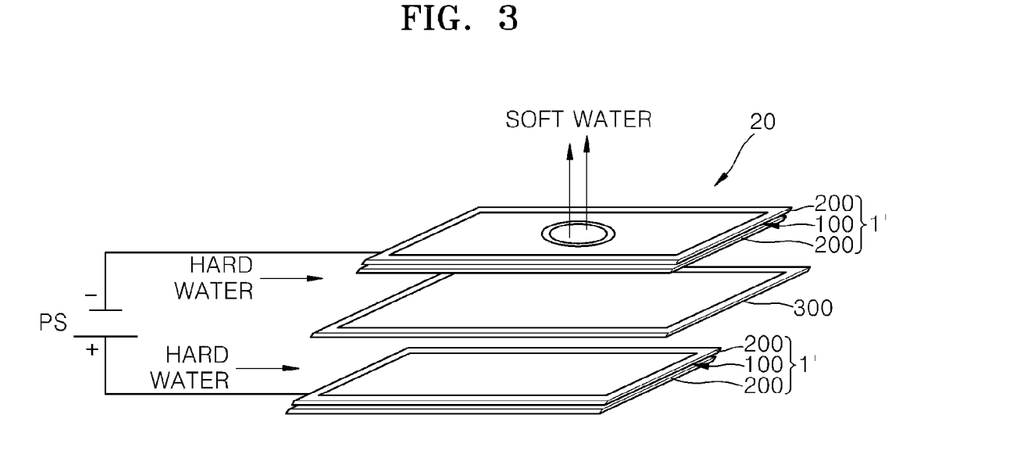
FIG. 3 is a perspective view schematically illustrating another exemplary embodiment of a capacitive deionization device including an electrode-current collector sheet similar to the electrode-current collector sheet of FIG. 1.
Figure 4:
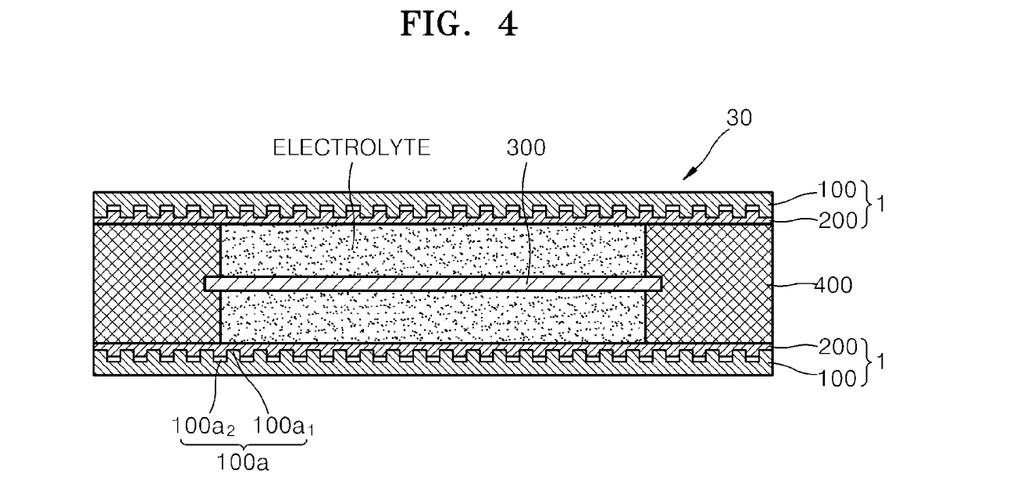
FIG. 4 is a cross-section view schematically illustrating an exemplary embodiment of an electric double layer capacitor including a pair of electrode-current collector sheets, each of which is the electrode-current collector sheet of FIG. 1.

The current collector 100 transfers a current generated from a device, such as the serpentine capacitive deionization device 10 of FIG. 2, the flow-through capacitive deionization device 20 of FIG. 3, or the electric double layer capacitor 30 of FIG. 4, each of which includes the electrode-current collector sheet 1, to an external conducting wire (not shown). Uneven portions 100a are disposed on at least one surface of the current collector 100. The uneven portions 100a increase a contact area between the current collector 100 and the electrode 200 covering the uneven portions 100a so as to reduce an electric resistance at an interface therebetween and to increase coherence therebetween, thereby increasing the capacity of the active material layer. In an embodiment, the electrode 200 comprises an active material layer. In addition, voids defined by the uneven portions 100a and the electrode 200 are used as flow paths for an electrolyte so as to increase the processing capacity of the flow-through capacitive deionization device 20 (see FIG. 3), which includes the electrode-current collector sheet 1. In an embodiment, the electrolyte contacts the electrode 200 at a surface within the voids defined by the uneven portions 100a and the electrode 200, as well as at another surface of the electrode 200.

The plurality of uneven portions 100a are disposed on a side of the current collector 100. In an embodiment, the uneven portions 100a may be formed by pressing the surface of the current collector 100 with a shaping unit (not shown) having the inverse shape of the uneven portions 100a. An average interval d between protrusions $100a_1$ of the uneven portions 100a may be, for example, between about 100 micrometers ("μm") and about 1 centimeter ("cm"), specifically between about 300 μm and about 2 millimeters ("mm"), more specifically about 1 mm. Thus, in an embodiment, flow paths for the electrolyte are provided while minimizing loss in pressure. The interval d between the protrusions $100a_1$ refers to an interval between the adjacent protrusions $100a_1$, thus in an embodiment d is a width of a groove $100a_2$ of the uneven portions 100a.

In an embodiment, a cross-section of the protrusion $100a_1$ of the uneven portions 100a has a square shape, but the invention is not limited thereto. For example, the cross-section of the protrusion $100a_1$ may have various shapes such as a triangular shape, an arched shape, a trapezoid shape, a pentagonal shape, or the like or a combination comprising at least one of the foregoing. In addition, the uneven portions 100a may be disposed so that the protrusions $100a_1$ and the grooves $100a_2$ are disposed in a stripe shape or as a matrix.

The current collector 100 may include a graphite foil, at least one metal selected from the group consisting of Cu, Al, Ni, Fe, Co, Ti, and the like, a mixture thereof, or alloy including at least one of the foregoing. In an embodiment, the current collector 100 may consist essentially of a graphite foil, at least one metal selected from the group consisting of Cu, Al, Ni, Fe, Co, Ti and the like, a mixture thereof, or alloy including at least one of the foregoing. In another embodiment, the current collector 100 may consist of a graphite foil, at least one metal selected from the group consisting of Cu, Al, Ni, Fe, Co and Ti, a mixture thereof, or alloy including at least one of the foregoing.

The electrode 200 is disposed on the current collector 100 so as to at least partially cover the uneven portions 100a. The electrode 200 comprises an active material layer. In another embodiment, the electrode 200 consists essentially of an active material layer. In yet another embodiment, the electrode 200 consists of an active material layer. In an embodiment, the electrode is coated on the current collector 100. Thus, in an embodiment, the electrode 200 and the active material layer may be identical.

Although not illustrated in FIG. 1, the electrode 200 may include an active material and a binder, and may further include a conductive agent.

The active material layer may include a material selected from the group consisting of an activated carbon, a carbon nanotube ("CNT"), a mesoporous carbon, an activated carbon fiber, a graphite oxide, a metal oxide, and the like and a mixture including the foregoing. In an embodiment, the active material layer may consist essentially of a material selected from the group consisting of an activated carbon, a carbon nanotube ("CNT"), a mesoporous carbon, an activated carbon fiber, a graphite oxide, a metal oxide, and the like and a mixture including the foregoing. In another embodiment, the active material layer may consist of a material selected from the group consisting of an activated carbon, a carbon nanotube ("CNT"), a mesoporous carbon, an activated carbon fiber, a graphite oxide, a metal oxide and a mixture including the foregoing.

The binder may include a polyurethane. The polyurethane may be water-dispersible and can be prepared by mixing poly(tetramethylene ether) glycol or polypropylene glycol, and isophorone diisocyanate or hydrogenated 4,4-diphenyl methane diisocyanate ("MDI"), which are disclosed in Korean Patent Application No. 2007-0071703, which is herein incorporated by reference.

The amount of the binder may be in the range of about 3 parts by weight to about 20 parts by weight, specifically about 5 parts by weight to about 15 parts by weight, more specifically about 10 parts by weight, based on 100 parts by weight of the active material. When the amount of the binder is less than about 3 parts by weight, the cohesion of the electrode 200 may decrease. When the amount of the binder is more than about 20 parts by weight, the capacity of the electrode 200 may decrease.

The conductive agent may include carbon black, vapour growth carbon fiber ("VGCF"), graphite, or the like or a mixture including at least one of the foregoing. In an embodiment, the conductive agent may consist essentially of carbon black, vapour growth carbon fiber ("VGCF"), graphite, or the like or a mixture including at least one of the foregoing. In another embodiment, the conductive agent may consist of carbon black, vapour growth carbon fiber ("VGCF"), graphite or a mixture including at least one of the foregoing.

FIG. 2 is a cross-section view schematically illustrating an exemplary embodiment of a serpentine capacitive deionization device 10 including a plurality of the electrode-current collector sheets 1, which have uneven portions disposed on one surface and are shown in of FIG. 1, and a plurality of double-sided electrode-current collector sheets 1', which have uneven portions disposed on opposing sides and are similar to the electrode-current collector sheets 1. In an embodiment, the capacitive deionization device 10 of FIG. 2 is a serpentine type water softener.

Referring to FIG. 2, the serpentine capacitive deionization device 10 includes the electrode-current collector sheets 1, the double-sided electrode-current collector sheets 1' and separators 300.

The electrode-current collector sheets 1 and the double-sided electrode-current collector sheets 1' each include the electrode 200 disposed on one or both sides of the current collector 100, respectively. The electrode-current collector sheets 1 and the double-sided electrode-current collector sheets 1' are stacked in a plurality of layers, and the separators 300 are respectively disposed between adjacent pairs of the electrode-current collector sheets, including electrode-current collector sheets 1 and double sided the electrode-current collector sheets 1'. A hole 100b is defined by an end portion of the current collector 100, the end portion corresponding to a region where the electrode 200 is not disposed. Thus hard water flows into the stack via an inlet 11 and flows in a serpentine path (or in a zigzag form) through a flow path, which includes the holes 100b, which are between adjacent the current collectors 100. Since the voids between the uneven portions 100a and the electrode 200 can be used as a flow path for the hard water, the processing capacity of the capacitive deionization device 10 can increase.

When the hard water passes through the capacitive deionization device, which comprises a stack, the stack comprising electrode-current collector sheets, the hard water is softened and changed into soft water, and the soft water is externally discharged via an outlet 12.

A power supply PS is electrically connected to the current collectors 100. Thus the current collectors 100 provide an electrical path for supply of electric charges to the electrodes 200 during charging, i.e., while softening the hard water, and to discharge the electric charges accumulated in the electrodes 200 during discharging, i.e., while regenerating the electrodes 200.

The separators 300 provide a flow path between the plurality of stacked electrodes 200, and substantially block an electrical contact between adjacent electrodes 200 and between adjacent current collectors 100. The separators 300 may include, for example, an acrylic fiber, a polyethylene film, a polypropylene film, or the like or a combination comprising at least one of the foregoing. In an embodiment, the separators 300 may consist essentially of, for example, an acrylic fiber, a polyethylene film, a polypropylene film, or the like or a combination comprising at least one of the foregoing. In another embodiment, the separators 300 may consist of, for example, an acrylic fiber, a polyethylene film, a polypropylene film or a combination comprising at least one of the foregoing.

The serpentine capacitive deionization device 10 has a large contact area between the current collector 100 and the electrode 200. Thus, coherence between the current collector 100 and the electrode 200 increases and an electrical resistance at an interface therebetween decreases, thereby increasing the capacity of the electrode 200. As the capacity of the electrode 200 is increased, the processing capacity of the serpentine capacitive deionization device 10 is further increased.

Operation, advantages, features and aspects of the serpentine capacitive deionization device 10 are described in further detail.

First, a process of softening hard water, also referred to as a charging process, is performed as follows.

While the power supply PS applies a direct current ("DC") voltage to the electrodes 200, hard water flows into the stack of the serpentine capacitive deionization device 10 via the inlet 11. The electrode 200, which is electrically connected to a positive terminal of the power supplier PS, is polarized with a positive voltage, and the electrode 200, which is electrically connected to a negative terminal of the power supplier PS, is polarized with a negative voltage. Referring to FIG. 2, the electrode 200, which is polarized with a positive voltage and the electrode 200, which is polarized with a negative voltage face each other, and the separator 300 is disposed therebetween. Accordingly, cations, such as hard water components, which can include $Ca^{2+}$, $Mg^{2+}$, or the like, included in the inflow hard water are absorbed onto the electrode 200 that is polarized with a negative voltage, and anions, such as harmful ions, such as $Cl^-$, or the like, are absorbed onto the electrode 200 that is polarized with a positive voltage. As a processing time passes, at least one of the cations and the anions, which are dissolved in the hard water, are absorbed and accumulated in the electrode 200. Accordingly, the hard water, which passes through the stack, is softened and turns into soft water. Moreover, the harmful ions included in the hard water are removed. However, as more processing time passes, a surface of the active material included in the electrode 200 is covered with the absorbed cations and anions, and thus the softening efficiency of the hard water slowly deteriorates. The softening efficiency of the hard water is determined by measuring the ionic conductivity of soft water flowing out from the outlet 12 according to time. Thus, in an embodiment, when the ionic conductivity of the soft water is low, the amounts of removed cations and anions are large, and thus the softening efficiency may be high. Inversely, when the ionic conductivity of the soft water is high, the amount of the removed cations and anions may be small, and thus the softening efficiency is low.

When the ionic conductivity of the soft water is equal to or greater than a selected value, the electrode 200 is desirably regenerated. Thus, in an embodiment wherein power supplied to the serpentine capacitive deionization device 10 is stopped and the serpentine capacitive deionization device 10 is electrically shorted so as to discharge the serpentine capacitive deionization device 10, the electrode 200 loses polarity, and thus the ions absorbed onto the active material of the electrode 200 may be desorbed. Accordingly, the active surface of the active material of the electrode 200 is restored. However, in an embodiment, not all of the ions absorbed onto the surface of the active material are desorbed since the absorbed ions, specifically cations, such as $Ca^{2+}$, $Mg^{2+}$, or the like, may react with anions to form a scale.

FIG. 3 is a perspective view schematically illustrating an exemplary embodiment of a flow-through capacitive deionization device 20 including a double-sided electrode-current collector sheet 1', which is similar to the electrode-current collector sheet 1 of FIG. 1. In an embodiment, the flow-through capacitive deionization device 20 of FIG. 3 is a flow-through type water softener.

Referring to FIG. 3, the flow-through capacitive deionization device 20 includes a plurality of double-sided electrode-current collector sheets 1' and a separator 300.

The double-sided electrode-current collector sheet 1' includes an electrode 200 disposed on opposing sides of the current collector 100. The double-sided electrode-current collector sheets 1' are stacked in a plurality of layers, and the separator 300 is disposed between the double-sided electrode-current collector sheets 1'. In another embodiment, the electrode 200 may be disposed on only one side of the current collector 100.

The flow-through capacitive deionization device 20 of FIG. 3 is different from the capacitive deionization device 10 of FIG. 2 in that a flow path of hard water of the flow-through capacitive deionization device 20 is a flow-through type path, instead of a serpentine type path. The serpentine capacitive deionization device 10 and the flow-through capacitive deionization device 20 have different flow paths, and thus the arrangement of the elements in the devices is different.

Other detailed structures, materials, and functions of each element included in the flow-through capacitive deionization device 20, and operation, advantages, features and aspects of the flow-through capacitive deionization device 20 are substantially identical to those described with reference to the serpentine capacitive deionization device 10 of FIG. 1, and thus further details thereof are not repeated.

FIG. 4 is a cross-section view schematically illustrating an exemplary embodiment of an electric double layer capacitor 30, including a pair of electrode-current collector sheets 1, each of which is the same as the electrode-current collector sheets disclosed above with respect to the serpentine capacitive deionization device 10 of FIG. 2. The electric double layer capacitor 30 may be used to store electricity.

Referring to FIG. 4, the electric double layer capacitor 30 includes electrode-current collector sheets 1, a separator 300 and a gasket 400.

Each of the electrode-current collector sheets 1 includes an electrode 200 disposed on a side of the current collector 100.

In further detail, the electrode-current collector sheets 1 are spaced apart from and face each other, the separator is disposed between the electrode-current collector sheets 1, an electrolyte is disposed in a space between the electrode-current collector sheet 1 and the separator 300, and the gasket 400 reduces or effectively prevents escape of the electrolyte by sealing both sides of the space. In more detail, each of the pair of electrode-current collector sheets 1 is disposed so that each electrode 200 is directed towards the separator 300.

The uneven portions 100a may be disposed as a matrix or in a stripe shape having a direction parallel or perpendicular to a direction of the uneven portions 100a, as is illustrated in FIG. 4.

The electrolyte may be an aqueous electrolyte, in which salt is dissolved, and may include a sodium chloride aqueous solution, a magnesium sulfate aqueous solution, a calcium sulfate aqueous solution, or the like or a mixture including at least one of the foregoing. In an embodiment, the electrolyte may be an aqueous electrolyte, in which salt is dissolved, and may consist essentially of a sodium chloride aqueous solution, a magnesium sulfate aqueous solution, a calcium sulfate aqueous solution, or the like or a mixture including at least one of the foregoing. In another embodiment, the electrolyte may be an aqueous electrolyte, in which salt is dissolved, and may consist of a sodium chloride aqueous solution, a magnesium sulfate aqueous solution, a calcium sulfate aqueous solution or a mixture including at least one of the foregoing.

The electric double layer capacitor 30 has an increased contact area between the current collector 100 and the electrode 200. Thus, coherence between the current collector 100 and the electrode 200 increases and an electric resistance at an interface therebetween decreases, thereby increasing the capacity of the electrode 200. As the capacity of the electrode 200 is increased, the processing capacity of the electric double layer capacitor 30 is further increased.

Operation, advantages, features and aspects of the electric double layer capacitor 30 are described in further detail.

First, when a DC voltage is applied to the electrodes 200, anions of the electrolyte are electrostatically induced to each electrode 200 polarized with a positive voltage, and cations of the electrolyte are electrostatically induced to the electrodes 200 polarized with a negative voltage. Accordingly, the anions and cations are absorbed onto the active material of each electrode 200, and thus an electric double layer is formed on each interface of the electrode 200 and the electrolyte. Such a process is referred to as charging. When the charging is completed, current does not flow in the electric double layer capacitor 30 any more. When a circuit (not shown) including a load (not shown) on the electrodes 200 is formed after charging, electrical energy of the electric double layer is reduced. Such a process is referred to as discharging.

During discharging, the electrodes 200 lose polarity, and thus the ions absorbed on the active material of the electrode 200 are desorbed. Accordingly, the active surface of the active material of the electrode 200 is restored.

The following examples are described only for illustrative purposes and are not intended to limit the scope of the invention.

EXAMPLES

Example 1

Manufacturing Electrode-Current Collector Sheet and Cell

1) Preparation of 5 Weight Percent ("wt %") of Polyurethane Solution 20 wt % of polyurethane aqueous dispersion was prepared by dispersing polyurethane prepared according to synthesis example 1 of Korean Patent Application No. 2007-0071703 in water. 5 wt % of dilute polyurethane solution was prepared by adding 300 parts by weight of 1-butanol to 100 parts by weight of the aqueous polyurethane dispersion.

2) Preparation of Slurry for Electrode Active Material Layer 0.9 grams ("g") of activated carbon having a specific surface area of 1300 square meters per gram, ("$m^2/g$"), and 0.1 g of carbon black were put into a high-speed stirred vessel, 2 g of the 5 wt % of polyurethane solution that was prepared in operation 1) stated above were added to the high-speed stirred vessel, and the resulting mixture was stirred by the high-speed stirrer for three minutes. 1 g of 1-butanol was added to the resulting mixture, and then stirred for three minutes again, thereby completing the preparation of slurry for an electrode active material layer.

3) Manufacturing Electrode-Current Collector Sheet Coating Slurry for Electrode Active Material Layer A surface of graphite foil (Qingdao G K, 380 μm) was pressed by a shaping roll having uneven portions with an average interval between protrusions of 0.5 mm, an average height and width of each protrusion of 1 mm, an arrangement of the uneven protrusions of a stripe shape, and a cross-section view of the uneven protrusion of a square shape, and then the inverse shape of the uneven portions of the shaping roll was formed on the graphite foil. Then, the slurry for the electrode active material layer was coated on the graphite foil having the inverse shape of the uneven portions. At this time, the amount of coated slurry was selected to be 10 milligrams per square centimeter ("$mg/cm^2$").

Drying

The resulting material was dried for 10 minutes at room about 20° C., and in an oven for 2 hours at 80° C., thereby completing the preparation of an electrode-current collector sheet.

4) Cell Preparation

The electrode-current collector sheet dried as above was cut to prepare 2 pieces, each having the dimensions 3 cm×3 cm and an area of 9 $cm^2$, and a weight of each piece was measured.

The two pieces of electrode-current collector sheet were put into an electrolyte, 1 molar ("M") of NaCl aqueous solution, and were vacuum-impregnated.

A cell was prepared by sequentially stacking one piece of the electrode-current collector sheets, a separator (material: polyolefine, manufacturer: Assai) and another piece of the electrode-current collector sheets.

Pressure applied to the cell was selected with a torque wrench, and the assembly of the cell was completed by increasing the torque up to 1.5 Newton-meters ("N-m").

Comparative Example 1

1) Preparation of Polytetrafluoroethylene ("PTFE") Suspension of 5 wt %

A PTFE suspension of 5 wt % was prepared by adding propylene glycol aqueous solution of 10 wt % to PTFE aqueous suspension of 60 wt %.

2) Electrode Preparation 0.9 g of activated carbon (specific surface area: 1300 $m^2/g$), and 0.1 g of carbon black (Timcal Super P™) were put into a stirred vessel, and the 2 g of the 5 wt % of PTFE suspension that was prepared in operation 1) stated above were added to the stirred vessel, thereby completing the preparation of slurry for an electrode active material layer. Then, the slurry was kneaded so as to obtain an electrode in a sheet shape.

3) Electrode Drying

The electrode was dried in an oven for 2 hours at 80° C., 1 hour at 120° C. and 1 hour at 200° C.

4) Cell Preparation

A cell was prepared in the same manner as in Example 1, except that the electrode prepared in Comparative Example 1 was used, a graphite foil without the above-described uneven portions was used as a current collector, and the graphite foil, one piece of electrode, a separator, another piece of electrode and the graphite foil were sequentially stacked in this order.

Evaluation Examples

Evaluation Example 1

Measurement of Cell Capacitance

The cells prepared in Examples 1 and 2, and Comparative Example 1 were each operated under the following conditions, and a capacitance was measured. The results of the measurement are shown in Table 1.

Each cell was operated at room temperature, while an electrolyte (1 M of NaCl aqueous solution) was supplied to the cell.

Each cell was charged with a static current (18 milliamperes ("mA"), 1.0 volt ("V") cutoff)/a static voltage (1.0 V, 2 mA cutoff), and was discharged with a static current (18 mA).

Evaluation Example 2

Measurement of Electrode Electrical Resistance

An electrical resistance of each of the electrodes prepared in Examples 1 and 2, and Comparative Example 1 was measured by using a 4-point probe (4-slitter CTB10, Changmin Tech.). The results of the measurement are shown in Table 1.

TABLE 1

|  | Capacitance (F/g)* | Electrical Resistance (Ohm)** |
|---|---|---|
| Example 1 | 155 | 55.8 |
| Comparative 1 | 86 | 80.9 |

*F/g refers to farads per gram;
**Ohm refers to Ohms

Evaluation Example 3

Evaluation of Electrolyte Pressure Loss

Loss of pressure in an electrolyte according to an average interval between protrusions was measured using the following method with respect to 5 kinds of electrode-current collector sheets. Here, each of the electrode-current collector sheets includes a current collector having an uneven portions wherein the protrusions are arranged in a stripe shape, have a square cross-section, and have an active material layer coated on the current collector. In addition, each of the electrode-current collector sheets is similar to the electrode-current collector sheet 1 of FIG. 1. The results of this measurement are shown in Table 2.

(1) Specifications of the electrode-current collector sheets that are subject to evaluation are further described in Table 2.

(2) Simulation was performed using the computational fluid dynamics ("CFD") program Ansys Fluent, available from ANSYS, Inc. to evaluate pressure loss.

(3) Simulation Parameters

1) Flow Rate of Electrolyte: 1 liter per minute ("lpm")

2) The parameters Length of Flow Path (Length of a Protrusion), Height of Flow Path (Height of Void between Electrode and Current Collector) and Average Width of Flow Path (Average Interval between Protrusions) are recited in Table 2.

TABLE 2

| Subject of Evaluation | Length of Flow Path (mm) | Height of Flow Path (mm) | Average Width of Flow Path (mm) | Loss in Pressure (kPa)*** |
|---|---|---|---|---|
| electrode-current collector sheet 1 | 50 | 0.1 | 0.05 | 14.45 |
| electrode-current collector sheet 2 | 50 | 0.1 | 0.2 | 14.38 |
| electrode-current collector sheet 3 | 50 | 0.1 | 0.5 | 12.33 |
| electrode-current collector sheet 4 | 50 | 0.1 | 1.0 | 12.34 |
| electrode-current collector sheet 5 | 50 | 0.1 | 2.0 | 12.33 |

***kPa refers to kilopascals

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A capacitive deionization device comprising:
a pair of integrated electrode-current collector sheets; and
a separator disposed therebetween,
wherein each of the integrated electrode-current collector sheets comprises:
a current collector comprising a grooved portion disposed on at least one side of the current collector; and
an electrode comprising an active material layer and disposed on the current collector, the active material layer at least partially covering the grooved portion,
wherein grooves of the current collector and protrusions of the electrode form voids between the current collector and the electrode.

2. The capacitive deionization device of claim 1, wherein an average interval between adjacent grooves is in the range of about 300 micrometers to about 2 millimeters.

3. The capacitive deionization device of claim 1, wherein the grooves of the grooved portion are disposed in a stripe shape or as a matrix.

4. The capacitive deionization device of claim 1, wherein the current collector comprises at least one selected from the group consisting of
graphite foil;
at least one metal selected from the group consisting of Cu, Al, Ni, Fe, Co, and Ti;
a mixture of metals selected from the group consisting of Cu, Al, Ni, Fe, Co, and Ti; and
an alloy of a metal selected from the group consisting of Cu, Al, Ni, Fe, Co, and T.

5. The capacitive deionization device of claim 1, wherein the active material layer comprises an active material and a binder.

6. The capacitive deionization device of claim 5, wherein the active material comprises a material selected from the group consisting of an activated carbon, a carbon nanotube, a mesoporous carbon, an activated carbon fiber, a graphite oxide and a metal oxide.

7. The capacitive deionization device of claim 5, wherein the binder comprises polyurethane,
   wherein the polyurethane is water-dispersible, and
   wherein the polyurethane is prepared from poly(tetramethylene ether) glycol or polypropylene glycol, and isophorone diisocyanate or hydrogenated 4,4-diphenyl methane diisocyanate.

8. The capacitive deionization device of claim 5, wherein an amount of an active binding ingredient of the binder is in the range of about 3 parts by weight to about 20 parts by weight based on 100 parts by weight of the active material.

9. An electric double layer capacitor comprising:
   a pair of integrated electrode-current collector sheets; and
   a separator disposed therebetween,
   wherein each of the integrated electrode-current collector sheets comprises:
   a current collector comprising a grooved portion disposed on at least one side of the current collector; and
   an electrode comprising an active material layer and disposed on the current collector, the active material layer at least partially covering the grooved portion,
   wherein grooves of the current collector and protrusions of the electrode form voids between the current collector and the electrode.

10. The capacitive deionization device of claim 1, wherein the voids have a width of about 100 micrometers to about 1 centimeter.

11. The capacitive deionization device of claim 1, wherein grooves of the current collector are integrated with corresponding protrusions of the electrode.

* * * * *